United States Patent [19]

Kojima et al.

[11] 4,240,484

[45] Dec. 23, 1980

[54] PNEUMATIC TIRE FOR LARGE SIZE AND HIGH SPEED MOTOR CYCLES TWO-WHEELED VEHICLES

[75] Inventors: Hiroshi Kojima, Hino; Takao Sakamoto, Kodaira; Tatsuro Shimada, Fussa, all of Japan

[73] Assignee: Bridgestone Tire Co., Ltd., Tokyo, Japan

[21] Appl. No.: 44,746

[22] Filed: Jun. 1, 1979

[30] Foreign Application Priority Data

Jun. 9, 1978 [JP] Japan ................................ 53/68910

[51] Int. Cl.$^3$ ..................... B60C 11/04; B60C 11/10
[52] U.S. Cl. .............................................. 152/209 R
[58] Field of Search ....... 152/209 R, 209 D, 209 NT; D12/141, 144, 142, 145, 146, 147, 148

[56] References Cited

U.S. PATENT DOCUMENTS

| | | | |
|---|---|---|---|
| D. 215,532 | 9/1969 | Parry | D12/141 |
| D. 223,740 | 5/1972 | Weinhold | D12/141 |
| D. 251,421 | 3/1979 | Kasahara et al. | D12/148 |
| D. 251,554 | 4/1979 | Kasahara et al. | D12/146 |

*Primary Examiner*—Michael W. Ball
*Attorney, Agent, or Firm*—Sughrue, Rothwell, Mion, Zinn and Macpeak

[57] ABSTRACT

A pneumatic tire for large size and high speed motor cycles is disclosed. The tire comprises a tread having a rib-block pattern defined by a central groove extending in a substantially circumferential direction of the tire at a center of a crown, a first circumferential groove adjacent to the central groove, a second circumferential groove arranged at that side of the first circumferential groove opposite to the central groove, which consists of a common portion united with the first circumferential groove and a non-common portion arranged circumferentially in a discontinuous manner independently of the common portion, and long and short transverse grooves arranged within regions located between the common portion and the tread edge on the one hand and between the non-common portion and the tread edge on the other hand.

12 Claims, 7 Drawing Figures

PNEUMATIC TIRE FOR LARGE SIZE AND HIGH SPEED MOTOR CYCLES TWO-WHEELED VEHICLES

This invention relates to pneumatic tires for motor cycles and more particularly to an improvement in a tread configuration of a pneumatic tire for large size and high speed motor cycles.

Generally, it is known that there is a great difference in running performances, particularly running performance along a curved course between pneumatic tires for motor cycles and pneumatic tires for four-wheeled vehicles such as passenger cars and the like. That is, pneumatic tires for motor cycles are mainly used under such a peculiar service condition that when a large camber angle is given to the wheel or the tire (i.e., the tire is inclined from a plane perpendicular to road surface) in the cornering of the vehicle, a camber thrust produced in the tire (or a force in a direction giving the camber angle and horizontal to road surface) is opposed to a centrifugal force acting to the body of the motor cycle. Thus, these tires have a radial sectional shape and a tread is formed about a crown of a carcass extending from the center of the crown to both sides thereof substantially parallel with a sectional profile of the carcass to such an extent that the tread has a width larger than a maximum width between sidewalls of the tire. The wording "substantially parallel" used herein means that a distance from the carcass line to an outer surface of the tread is actually equal along the profile of the carcass and is concentrically related to a roundness of the profile.

When the motor cycle is run with cornering at a speed of less than about 160 km/hr, the camber angle given to the tire is frequently within a range of 20°-30°.

Particularly, when the running speed is more than 200 km/hr, if a larger camber angle of 40°-45° is not given to the tire, the motor cycle can not be run in cornering by a controlling will of a rider. Therefore, even if the tire is inclined at such a large camber angle, it is necessary to considerably enlarge a width of the tread to maintain a satisfactory ground contact area of the tire as mentioned above. This is especially true of pneumatic tires for large size motor cycles.

The running stability, particularly the camber characteristic of the pneumatic tire for motor cycles is largely dependent upon the tread pattern of the tire. Therefore, the tread pattern is required to develop a good camber characteristic to avoid giving an unstable feeling to a driver in any states at a camber angle range below a given maximum angle. Of course, this fact is required in all weather.

In this connection, there will be described conventional tread patterns as shown in FIGS. 1 and 2 below.

In FIGS. 1 and 2 are shown schematic plan views illustrating a part of circumferential right half of a tread pattern commonly used in the pneumcatic tire for motor cycles, respectively. In these figures, a line X—X represents the circumferential center line of a tread 1 and is also a symmetrical axis.

Referring to FIG. 1, the tread 1 comprises a central groove 2 extending circumferentially at the center line X—X, a first circumferential groove 3a arranged near a center between the center line X—X and a line Y—Y indicating a middle position from the central groove 2 to a tread edge e, and second and third circumferential grooves 3b and 3c cutting an area between the line Y—Y and the tread edge e substantially into three equal parts toward a widthwise direction of the tread. Further, a first transverse groove 4a extending from the first circumferential groove 3a to the tread edge e and a second transverse groove 4b extending between the first and second circumferential grooves 3a and 3b are arranged alternately in the circumferential direction of the tread. By these grooves are defined a circumferential rib 5, a first transversely elongated block 6, second and third longitudinally elongated blocks 7 and 8.

In the tread pattern of FIG. 1, the circumferential rib 5 and a slight part of the first block 6 come into contact with road surface during the straight running. On the other hand, when the tire is run along a curved course in an inclined state, the first block 6 having a high rigidity in a direction causing the camber thrust (direction perpendicular to the line X—X) or further the second block 7 mainly comes into contact with road surface according to the camber angle given to the tire. Moreover, the third block 8 is also provided.

The tread pattern of FIG. 1 is designed to be suitable for running on a dry road surface in view of the type of the blocks. On the contrary, the tread pattern shown in FIG. 2 is designed to be suitable for running on a wet road surface. In the tread 1' of FIG. 2, the second circumferential groove 3b is arranged on the line Y—Y at the middle position between the central groove 2 and the tread edge e, and the first and third circumferential grooves 3a and 3c are arranged at substantially center positions between the line X—X and the line Y—Y on the one hand and between the line Y—Y and the tread edge e on the other hand. Further, a fourth circumferential groove 3d is arranged near the tread edge e. Moreover, the transverse grooves 4a and 4b are arranged to locally extend from the second circumferential groove 3b to certain limited distances, respectively. In this way, the tire of FIG. 2 has a tread pattern such that the draining effect is increased at the ground contact surface of the tread. According to the tread pattern of FIG. 2, a circumferential rib 5' is defined between the first and second circumferential grooves 3a and 3b instead of the first block 6 shown in FIG. 1 and also a circumferential rib 9 is additionally formed along the tread edge e.

In any case, these tread patterns have attractive merits according to the kind and applications of motor cycle, respectively. However, when the tire of such a tread pattern is applied to a large size motor cycle running at a high speed of more than 200 km/hr, if the body of the vehicle is significantly inclined in cornering, a camber thrust to be produced in the tire toward a direction horizontal to road surface is insufficient to be opposed by a centrifugal force accompanied with the cornering movement. As a result, it has been confirmed from experiments that there is caused an abnormal oscillation wherein the front and rear tires swing little by little in right and left directions with a steering axis of the vehicle as a fulcrum or there is induced a fear that safety driving cannot be performed due to the poor camber thrust of the tire.

It is, therefore, an object of the invention to advantageously solve the above mentioned drawbacks of the prior art and to provide a pneumatic tire developing excellent running performances even on a wet road surface.

According to the invention, there is provided a pneumatic tire for large size and high speed motor cycles comprising a toroidal carcass, and a tread superimposed about a crown of said carcass and extending from a center of said crown to both sides thereof substantially parallel with a sectional profile of said carcass to such an extent that the tread has a width larger than a maximum width between sidewalls of the tire; said tread having a rib-block pattern defined by a central groove extending in a substantially circumferential direction of the tire at the center of said crown, a plurality of circumferential grooves arranged symmetrically with respect to said central groove and a plurality of transverse grooves crossed with said circumferential grooves. The invention is characterized by defining said pattern with a first circumferential groove adjacent to said central groove, a second circumferential groove arranged at that side of said first circumferential groove which is opposite to said central groove and consisting of a common portion united with said first circumferential groove and a non-common portion arranged circumferentially in a discontinuous manner independently of said common portion, and long and short transverse grooves arranged within regions located between said common portion and the tread edge on the one hand and between said non-common portion and the tread edge on the other hand.

The invention will be described in greater detail with reference to the accompanying drawings, wherein.

Figure 1:
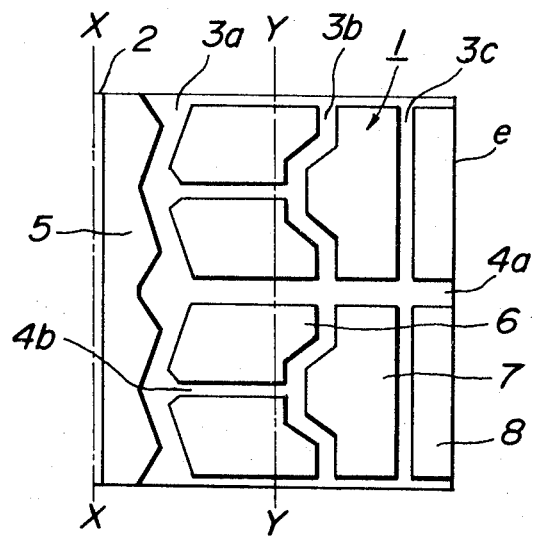
FIGS. 1 and 2 are plan views of a portion of tread patterns commonly used in pneumatic tires for motor cycles as mentioned above, respectively.
Figure 2:
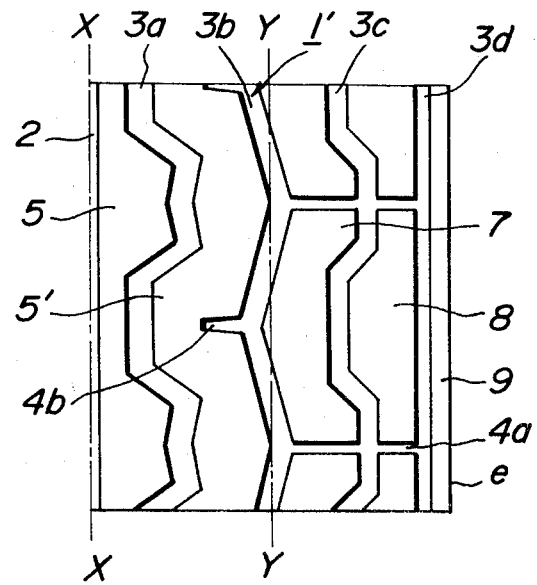
Figure 3:
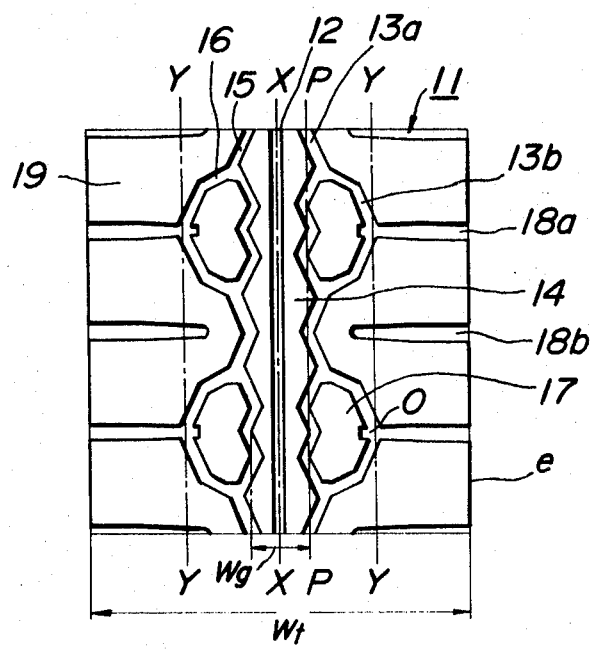
FIGS. 3 and 4 are plan views of embodiments of a tread pattern used in a pneumatic tire for large size motor cycles according to the invention, respectively.
Figure 4:
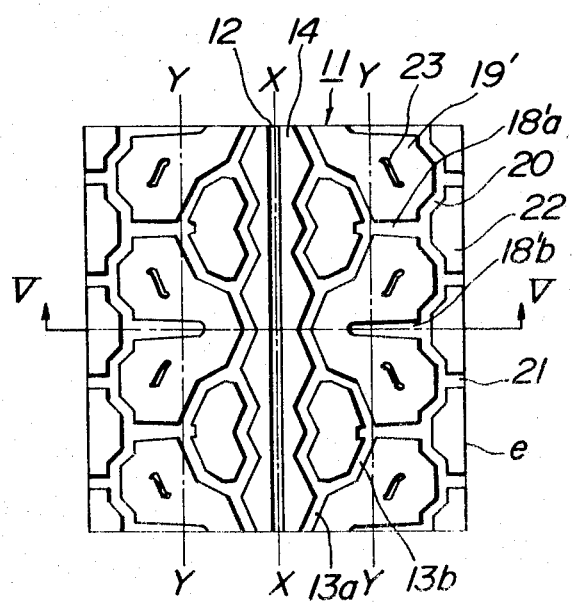
Figure 5:
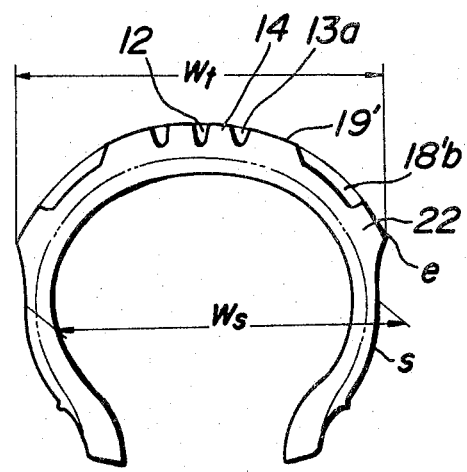
FIG. 5 is a sectional view of the tire taken along a line V—V of FIG. 4.

In FIGS. 3 and 4 are shown plan views of circumferentially cut portions of the tread in the pneumatic tire for motor cycles according to the invention, respectively, and in FIG. 5 is shown a sectional view of the tire taken along a line V—V of FIG. 4.

Throughout the specification, a measure extending in the widthwise direction of the tire is expressed by a shortest distance between two corresponding points on a sectional profile curve of the tread including a rotational axis of the tire, i.e., a length of a chord.

Referring to FIG. 3, a tread 11 comprises a central groove 12 extending circumferentially at a circumferential center line X—X of the tread 11 (overlapped with a center of a carcass crown), and first and second circumferential grooves 13a and 13b of zigzag configuration arranged in turn toward a tread edge e.

In these grooves inclusive the central groove 12, the degree of amplitude of zigzags increases in the direction from the center of the tread to the edge thereof. In this embodiment, the central groove 12 is a straight groove having no amplitude, while the first and second circumferential grooves 13a and 13b are formed in such a manner that an amplitude $a_2$ of the second circumferential groove 13b is 1.5–8 times of an amplitude $a_1$ of the first circumferential groove 13a.

Figure 6:
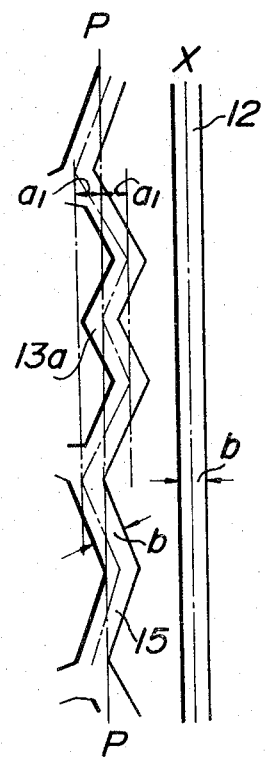
FIGS. 6 and 7 are enlarged partial diagrammatical views illustrating first and second circumferential grooves in the tire according to the invention, respectively.

A pair of the first zigzag circumferential grooves 13a, 13a are arranged symmetrically with respect to the center line X—X in such a manner that a distance Wg between directrixes P—P sandwiching the center line X—X is 20–30% of a tread width Wt, provided that the directrix P—P indicates a bisector of a maximum zigzag width $2 \times a_1$ of the groove 13a as shown in FIG. 6. A rib 14 extending substantially continuously in the circumferential direction of the tire is defined between the central groove 12 and the first circumferential groove 13a.

Moreover, it is preferable that the amplitude $a_1$ of the groove 13a is not more than 7% of the tread width Wt.

The second circumferential groove 13b consists of a common portion 15 united with the first circumferential groove 13a and a non-common portion 16 being independent of the groove 13a, both portions 15 and 16 being arranged alternately along the circumferential direction of the tire at substantially equal intervals. As a result, first island blocks 17 are defined circumferentially of the tread in a discontinuous manner by the non-common portion 16 of the second circumferential groove 13b and a portion of the first circumferential groove 13a excluding the common portion 15 of the second circumferential groove 13b.

Figure 7:
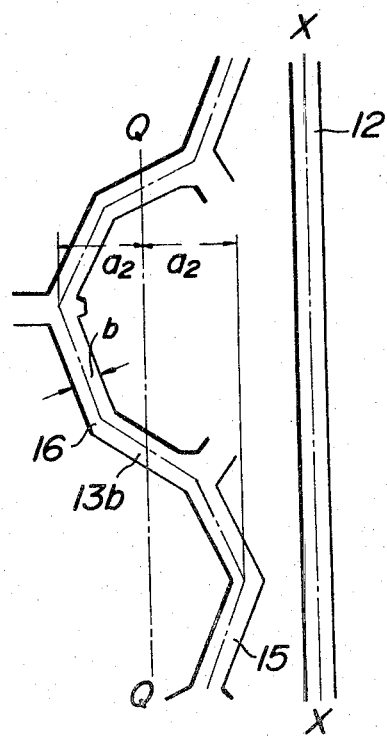

As shown in FIGS. 6 and 7, the second circumferential groove 13b forms a modified zigzag configuration wherein the amplitude $a_2$ is bent multiply symmetrically with respect to a directrix Q—Q, but one or both of the amplitudes may be shaped into a sine curved wave. According to the invention, it is particularly important that the second circumferential groove 13b consisting of the common portion and non-common portion as described above is constructed by superimposing both the grooves 13a and 13b with each other. Further, it is desirable that a peak of the amplitude $a_2$ of the second circumferential groove 13b directing toward the tread edge as defined below is positioned at a distance from the center line X—X corresponding to 20–35% of the tread width Wt.

Next, short and long transverse grooves 18a and 18b are arranged within regions located between the non-common portion 16 and the tread edge e on the one hand and between the common portion 15 and the tread edge e on the other hand in such a manner that the short transverse groove 18a communicates at its one end with the second circumferential groove 13b and the long transverse groove 18b is free at its one end from the first circumferential groove 13a. In this way, there are defined second blocks 19 cooperating with the first blocks 17.

These transverse grooves 18a and 18b are arranged to extend straightly in a direction perpendicular to the center line X—X in the embodiments of FIGS. 3 and 4, but they can be transformed into a zigzag form or wave form or they can be inclined at a certain angle to a direction perpendicular to the center line X—X or into a chevron form without damaging the object for the formation of the second blocks.

The feature of the invention lies in that the rigidity of the tread is gradually increased from the center of the tread 1 toward both edges thereof by locating an outer peak of the second zigzag circumferential groove 13b having a large amplitude (i.e. an intersection 0 with the transverse groove 18a) at a line Y—Y indicating substantially a quarter position of the tread width Wt or near the line Y—Y to arrange a second large block 19 defined by the second circumferential groove 13b and the transverse groove 18a near the tread edge e, an inner portion of which being tapered toward the common portion 15 of the second circumferential groove 13b and adjoined to the circumferential rib 14.

In the pneumatic tire according to the invention, therefore, the circumferential rib 14 defined by the central groove 12 and the first circumferential groove 13a having a relatively fine zigzag configuration, and a part of each of the first and second blocks 17 and 19 near the center of the tread come into contact with road surface during the straight running, while the portions of the first and second blocks 17 and 19 developing a higher rigidity according to the increase of the camber angle come into contact with road surface during the cornering condition, so that a camber thrust required for the cornering can easily be obtained.

Moreover, it is preferable that 1.5 to 2 blocks 19 get into each half of the ground contact area of the tire viewed from the center line X—X taking the ground contact ability into account.

In the embodiment of FIG. 4, a third circumferential groove 20 of a reversible frustconical form or a so called Acme form is further arranged near the tread edge e, outward ends of the transverse grooves 18'a and 18'b are terminated to the groove 20. And also, an auxiliary transverse groove 21 is arranged at a middle position between the grooves 18'a and 18'b from the third circumferential groove 20 toward the tread edge e, whereby there is defined an auxiliary block 22.

In this embodiment, the width of the block 19' is somewhat shortened by the addition of the third circumferential groove 20, so that the block 19' is provided therein with a pair of inclination grooves 23, arranged symmetrically with respect to the transverse groove 18'b and converged toward the center line X—X, the grooves 23, being distant apart from the surrounding grooves, in order to improve the road-holding ability, whereby the draining effect is particularly improved.

Even if the third circumferential groove and inclination grooves are additionally formed as shown in FIG. 4, the fundamental feature of the invention that the ground contact area of the blocks having a high transversal ridigity increases as the camber angle increases in the cornering condition is not substantially changed.

Among the grooves of various kinds as described above, at least circumferential grooves have a width b corresponding to 1.5-5% of the tread width Wt. Preferably, the width b is 2-4%.

In FIG. 5 is shown a radial section of the tire taken along a line V—V of FIG. 4, from which there can be seen a relation between the two circumferential ribs 14 arranged symmetrically with respect to the central groover 12 and the two second blocks 19' defined in the circumferential direction of the tire by the first circumferential groove 13a and the transverse groove 18'b over the tread width Wt larger than a maximum width Ws between the sidewalls s of the tire.

According to the invention, the rib or block may further be provided with sipes.

A high-speed running test was made with respect to four tires with a size of 4.25-18, each tire having the tread pattern shown in FIGS. 1, 2, 3 and 4.

Each of these tires was reinforced with a carcass of a so-called bias construction composed of 4 plies in total, each ply being composed of nylon cord of 840 d/2, wherein the cords of these plies are crossed with each other at an angle of 30° with respect to the circumferential center line of the tread, and a breaker composed of one ply of nylon cord of 1260 d/2 and superimposed about the outermost ply of the carcass so as to cross therewith at an angle of 30°. Further, these tires had a maximum width Ws between the sidewalls of 115 mm and a tread width Wt of 125 mm.

Each of these tires was mounted on a rear wheel of a large size motor cycle mounted 1,000 cc engine under an inflation pressure of 2.5 kg/cm² (a front wheel of the vehicle was mounted with the conventional tire having a rib type tread pattern).

Such a vehicle was run on a circuit of 5,500 m consisting of a straight portion and a curved portion with a radius of curvature of 400 m (the curved portion is not provided with a bank) at a speed of 225 km/hr in case of the straight portion and at a speed of 200 km/hr in case of the curved portion, during which feeling tests were made by a test driver.

The test results as shown in the following table, wherein the tires having the tread patterns shown in FIGS. 1, 2, 3 and 4 are represented by symbols A, B, C and D in this order.

|  |  | Prior art | | Invention | |
| --- | --- | --- | --- | --- | --- |
|  |  | A | B | C | D |
| Straight | dry | o | o | o | o |
| running | wet | o | o | o | o |
| Turning | dry | o | x | o | o |
|  | wet | Δ | o | o | o |

In the above table, the term "dry" means a dry road surface and the term "wet" means a wet road surface (containing no puddle). Further, symbol o means smooth running without an abnormal feeling, symbol × - means abnormal oscillation of the handle, and symbol Δ means unstable feeling due to poor road-holding.

As apparent from the above, the tire comprising a tread composed of a unique combination of the circumferential grooves and transverse grooves according to the invention can develop an excellent steering stability irrespective of dry and wet road surfaces as a pneumatic tire for large size and high speed motor cycles.

What is claimed is:

1. In a pneumatic tire for large size and high speed motor cycles comprising a toroidal carcass, and a tread superimposed about a crown of said carcass and extending from a center of said crown to both sides thereof in substantially parallel with a sectional profile of said carcass to such an extent that the tread has a width larger than a maximum width between sidewalls of the tire; said tread having a rib-block pattern defined by a central groove extending in a substantially circumferential direction of the tire at the center of said crown, a plurality of circumferential grooves arranged symmetrically with respect to said central groove and a plurality of transverse grooves crossed with said circumferential grooves, the improvement characterized by defining said pattern with a pair of first circumferential grooves arranged symmetrically with respect to said central groove in such a manner that a distance between directrixes each indicating a bisector of a maximum width of said first circumferential groove is 20-30% of tread width, a pair of second circumferential grooves arranged symmetrically with respect to said central groove at those sides of said first circumferentials groove which are opposite to said central groove and each consisting of a common portion united with each of said first circumferential grooves and a non-common portion arranged circumferentially in a discontinuous manner independently of said common portion, long and short transverse grooves arranged within regions located respectively between said common portion and the tread edge and between said non-common portion and the tread edge said short transverse groove communicating at one end with said non-common portion of said second circumferential groove, said long transverse grooves not communicating with said common portion of said second circumferential groove, and the degree of zig-zag of said central groove, first and second circumferential grooves increasing from the center of the tire toward the edges whereby in the ground contact area of the blocks transverse rigidity increases as camber angle increases.

2. A pneumatic tire as claimed in claim 1, wherein said first circumferential groove defines a substantially continuous circumferential rib with said central groove.

3. A pneumatic tire as claimed in claim 1, wherein a said first circumferential groove is a continuous groove extending in a zigzag configuration in the circumferential direction of the tire.

4. A pneumatic tire as claimed in claim 1, wherein a pair of said second circumferential grooves are arranged symmetrically with respect to said central groove in such a manner that a distance between outward peaks of each of said second circumferential grooves directing to the tread edge is 40-70% of the tread width.

5. A pneumatic tire as claimed in claim 3, wherein said second circumferential groove is a continuous groove extending in a zigzag configuration toward the circumferential direction of the tire through said common portion united with said first circumferential groove in such a manner that an amplitude of zigzags of said second circumferential groove is 1.5-8 times of an amplitude of zigzags of said first circumferential groove.

6. A pneumatic tire as claimed in claim 1, wherein said second circumferential groove defines a first island-type independent block with that portion of said first circumferential groove which is independent of said common portion of said second circumferential groove in a discontinuous manner toward the circumferential direction of the tire.

7. A pneumatic tire as claimed in claim 1, wherein said short transverse groove is crossed with said non-common portion of said second circumferential groove.

8. A pneumatic tire as claimed in claim 1, wherein said long and short transverse grooves are arranged at substantially equal intervals in the circumferential direction of the tire.

9. A pneumatic tire as claimed in claim 1, wherein said long and short transverse grooves are crossed with a third circumferential groove arranged near the tread edge and extending circumferentially along the tread edge.

10. A pneumatic tire as claimed in claim 9, wherein said long and short transverse grooves are terminated to said third circumferential groove and communicate with the tread edge through an auxiliary groove extending from the third circumferential groove toward the tread edge.

11. A pneumatic tire as claimed in claim 9, wherein said second and third circumferential grooves and a pair of said short transverse grooves defines a second block dividing substantially into two equal parts by said long transverse groove, these parts being communicated with each other along said common portion of said second circumferential groove.

12. A pneumatic tire as claimed in claim 11, wherein said second block is provided therein with a pair of inclination grooves arranged symmetrically with respect to said long transverse groove and converged toward the center of said crown.

* * * * *